United States Patent

Allen et al.

[11] Patent Number: 5,838,387
[45] Date of Patent: Nov. 17, 1998

[54] DIGITAL VIDEO SCALING ENGINE

[75] Inventors: John L. Allen, Hillsboro; Leonard W. Cross, Portland; Ali S. Oztaskin, Beaverton, all of Oreg.

[73] Assignee: Intel Corporation, Santa Clara, Calif.

[21] Appl. No.: 771,300

[22] Filed: Dec. 20, 1996

[51] Int. Cl.$^6$ .......................... G06F 15/66; H04N 5/262
[52] U.S. Cl. .......................... 348/581; 348/222; 382/298
[58] Field of Search .................... 348/581, 582, 348/222, 239, 240; 382/298, 299, 300; 345/127, 131; H04N 5/262

[56] References Cited

U.S. PATENT DOCUMENTS

| | | | |
|---|---|---|---|
| 4,797,751 | 1/1989 | Yamaguchi | 386/117 |
| 5,402,513 | 3/1995 | Schafer | 348/581 |
| 5,574,572 | 11/1996 | Malinowski | 348/451 |
| 5,594,495 | 1/1997 | Palmer | 348/17 |
| 5,710,573 | 1/1998 | Hung | 348/584 |

*Primary Examiner*—Howard Britton
*Attorney, Agent, or Firm*—Blakely, Sokoloff, Taylor & Zafman

[57] ABSTRACT

A video scaling engine for scaling video data over a plurality of clock cycles is disclosed. In a first clock cycle of the plurality of clock cycles, a multiplier of the video scaling engine multiplies an input pixel by a coefficient indicated by a coefficient select signal to generate a first product. The first product is stored in an accumulator of the video scaling engine. In a second clock cycle of the plurality of clock cycles, the multiplier multiplies another input pixel by a coefficient indicated by another coefficient select signal to generate a second product. The second product is added to the contents of the accumulator to produce a sum including the first and second products. The sum including the first and second products is stored in the accumulator and then divided by a value based on at least one of the coefficients to produce a scaled output pixel.

18 Claims, 6 Drawing Sheets

DIGITAL VIDEO SCALING ENGINE

BACKGROUND OF THE INVENTION (1) Field of the Invention

The present invention relates to video data processing. More specifically, the present invention relates to an apparatus and method for scaling digital video data.

(2) Art Background

Advances in computer and communication technology have made video teleconferencing increasingly available to the home computer user. Since computer-based video teleconferencing requires that image data be digitized and then transferred between the computers of the teleconferencing parties, the increased availability of home computer-based video teleconferencing has created a demand for inexpensive, low power video cameras capable of feeding digital image data directly into a personal computer.

One desirable feature of a video camera to be used in a video teleconference is the ability to scale a video image to various sizes prior to transmission. Smaller images, while providing less detail, require less communication bandwidth and can be reproduced by a recipient computer more quickly. Larger images, of course, provide greater detail but require more communication bandwidth and more processing to reproduce. Generally, a camera will generate a video image having a maximum size defined by the camera's image sensor. The image can then be scaled to a smaller image by a scaling apparatus within the camera itself or by a programmed computer receiving the output of the camera.

When video data is scaled to reduce the number of pixels in the output image, it is desirable to incorporate as much of the original video data as possible in the reduced image. For example when eight pixels on a video scanline are scaled to four pixels, it is desirable to utilize each of the eight pixels to generate the four pixel representation.

A finite impulse response (FIR) digital filter is useful for scaling digital video data because it provides an output value that represents a weighted combination of input values. The distinguishing characteristic of a FIR filter is that an input signal component contributes to the filter output for a finite time. Analytically, a FIR filter is described by the equation:

$$y(kT)=a_0*x(kT)+a_1*x(kT-T)+a_2*x(kT-2T)+ \ldots a_n*x(kT-nT)$$

where T is the discrete time sampling interval, k is a constant indicating the $k^{th}$ output value of y, n is a constant indicating the number of terms (n+1) in the filter input, and $a_0$-$a_n$ are coefficients applied to input x. It will be appreciated that any sample older than kT−nT will no longer contribute to the filter output. Thus, an impulse in the filter input x will have finite effect on the filter output y.

A FIR filter is characterized by the number of input terms, referred to as taps, contributing to the filter output. In a filter having N taps, N multiplications of input samples by filter coefficients must be performed to produce N filter terms, and N−1 additions of the filter terms must be performed to produce the filter output y. It is common to assign fractional values to coefficients $a_0$-$a_n$ so that the sum of coefficients $a_0$-$a_n$ equals one, thereby normalizing the filter output y. Alternatively, filter output y may be normalized by dividing y(kT) by a value equal to the sum of coefficients $a_0$-$a_n$.

Existing video cameras that employ digital filtering of source pixels to provide a scaled output are designed to produce each output pixel in a single cycle of the source pixel clock. In other words, each of the taps of a multi-tap filter must be applied in the same clock cycle. Consequently, a significant number of multiplication and addition circuits are required to process each separate filter tap in parallel. As the number of multiplication and addition circuits increases, filter propagation delay and power consumption also increase. Further, where the scaling apparatus is implemented in an integrated circuit (IC), the increased number of multiplication and addition circuits translates to an increased die size of the implementing IC. The net result is a more expensive scaling engine.

It would be desirable therefore to provide an apparatus and method for scaling data that utilizes a reduced number of multiplication and addition circuits so that the implementing die size, filter propagation delay and power consumption may be correspondingly reduced.

BRIEF SUMMARY OF THE INVENTION

A method and apparatus for scaling video data are disclosed. By scaling the video data in a scaling engine including a multiplier and accumulator configured to implement an N-tap FIR over N cycles of an input clock, the number of multiplication and addition circuits needed to implement the FIR is reduced. The method of the present invention is performed over a plurality of clock cycles in a video camera. In one of the plurality of clock cycles, a first pixel is multiplied by a first coefficient to produce a first product. The first product is stored in an accumulator. In another of the plurality of clock cycles, a second pixel is multiplied by a second coefficient to produce a second product. The second product is added to the contents of the accumulator to produce a sum including the first and second products. Of course, the sum may also include products generated by the multiplier during clock cycles between the first and second clock cycles. The sum including the first and second products is stored in the accumulator and then divided by a value based on at least one of the first and second coefficients to produce a scaled pixel output.

The apparatus of the present invention may be incorporated in a video camera, a video cassette recorder or other apparatus which requires video data to be scaled. The apparatus includes a multiplier for multiplying an input pixel by a selected filter coefficient to produce a product, an accumulator for accumulating a sum of products output by the multiplier over successive clock cycles, and a divider for normalizing the sum of products accumulated in the accumulator.

BRIEF DESCRIPTION OF THE DRAWING

FIG. 6 illustrates the manner in which filter coefficients are applied to an input pixel stream to achieve 3:2, 5:3, 2:1 and 12:11 scaling ratios.

DETAILED DESCRIPTION OF THE INVENTION

A method and apparatus for scaling digital video data in a video camera are described below. Although numerous specific details are set forth in order to provide a thorough understanding of the present invention, it will be apparent to one skilled in the art that the present invention may be practiced without such specific details. For example, much of the following description relates to an apparatus for scaling digital video data that has been incorporated into a video camera. However, it will be appreciated that an apparatus according to the present invention may also be used in a video cassette recorder, a still-image camera or any other device in which it is useful to scale video data.

Apparatus for Scaling Digital Video Data

Figure 1:
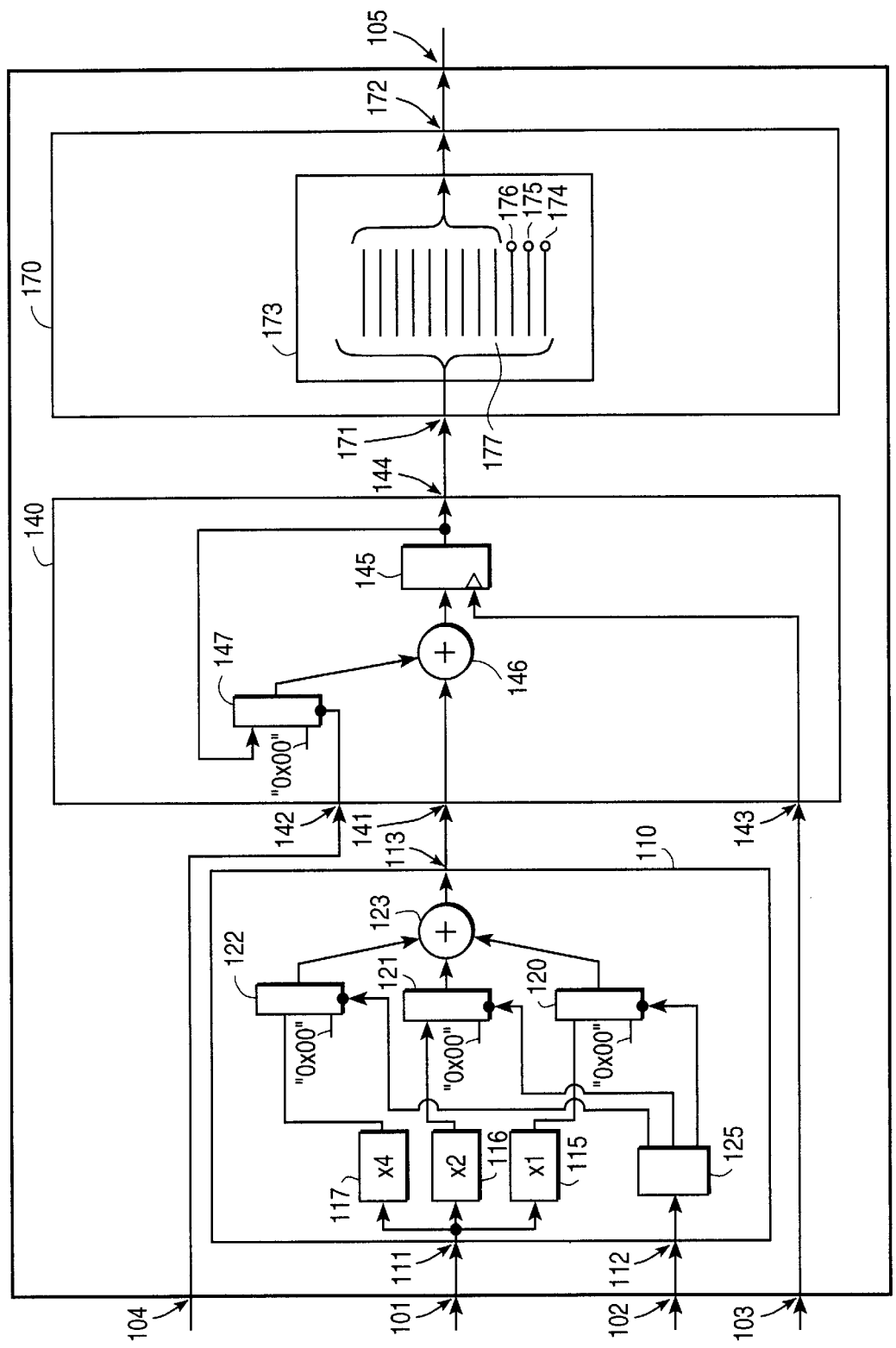
FIG. 1 illustrates a video scaling engine according to the present invention.

FIG. 1 depicts a digital video data scaling engine 100 for generating a filtered output pixel by applying a multiple-tap FIR filter to a plurality of input pixels. Scaling engine 100 employs multiple clock cycles to generate the filtered output pixel. The logic design of the scaling engine 100 is streamlined as the number of multiplication and addition circuits is reduced. When implemented on an application-specific integrated circuit (ASIC), the result of the streamlined design is reduced propagation delay, power consumption and semiconductor die size.

Video scaling engine 100 includes a multiplier 110, an accumulator 140 and a divider 170, and receives pixel data at pixel data input 101, a coefficient select signal at coefficient select input 102, a store enable signal at store enable input 103 and an accumulate enable signal at accumulate enable input 104. Although video scaling engine 100 is described below as performing a three-tap FIR filter, it will be appreciated that the architecture depicted may be used to implement a FIR filter having any number of taps.

Video Scaling Engine Bit-Slice Multiplier

Multiplier 110 of scaling engine 100 receives a sequence of pixels from pixel input 101 at multiplier input 111 and a sequence of coefficient select signals from coefficient select input 102 at selector input 112. Herein, the term pixel refers to a numeric value representing a component of an image such as a luminance, chrominance or combined luminance and chrominance value at a particular location in the image. In one embodiment of the present invention, a pixel received at pixel input 101 and a coefficient select signal received at coefficient select input 102 are each represented by a plurality of parallel bits.

Pixels received at pixel input 111 are routed to a plurality of multiplying circuits 115, 116 and 117 in a bit-slice arrangement. In one embodiment of the present invention, each of the multiplying circuits 115, 116 and 117 multiplies a pixel received therein by a different power of two by shifting the input pixel by the appropriate number of bits. Multiplying circuit 117, for example, shifts the input pixel left (in a direction of increased significance) by two bits to multiply the pixel by four. Multiplying circuit 116 shifts the input pixel left by one bit to multiply the pixel by two and multiplying circuit 115 passes the input value to the output to effect a unity (x2⁰) multiplier.

The output of multiplying circuits 115, 116 and 117 is coupled to the input of multiplexers 120, 121 and 122, respectively. Each of the multiplexers 120, 121 and 122 is configured to output the multiplied pixel, if enabled, and to output a zero value (designated "0x00" in FIG. 1), if disabled.

Multiplexers 120, 121 and 122 are enabled by the coefficient select signal after it has been decoded by coefficient select decoder 125. In one embodiment of the present invention, the coefficient select signal is represented by a group of parallel bits so that coefficient select decoder 125 is simply a routing of each of the conductors carrying the bits of the coefficient select signal to a respective one of the multiplexers 120, 121 and 122.

Multiplier 110 includes adder 123 coupled to the output of each of the multiplexers 120, 121 and 122 to add the values received therefrom. The output of adder 123 is the multiplier output 113.

The effect of multipliers 115, 116 and 117, multiplexers 120, 121 and 122, adder 123 and coefficient select decoder 125 is to allow multiplication of a pixel received at the pixel input 101 of scaling engine 100 by integer values ranging from 0 to $2^N-1$, where N is the number of multiplying circuits. This is illustrated by the following table in which N=3:

| Coeff Select Signal | Output of Mux 122 | Output of Mux 121 | Output of Mux 120 | Multiplier Output 113 |
| --- | --- | --- | --- | --- |
| 0 0 0 b | 0 | 0 | 0 | data × 0 |
| 0 0 1 b | 0 | 0 | data × 1 | data × 1 |
| 0 1 0 b | 0 | data × 2 | 0 | data × 2 |
| 0 1 1 b | 0 | data × 2 | data × 1 | data × 3 |
| 1 0 0 b | data × 4 | 0 | 0 | data × 4 |
| 1 0 1 b | data × 4 | 0 | data × 1 | data × 5 |
| 1 1 0 b | data × 4 | data × 2 | 0 | data × 6 |
| 1 1 1 b | data × 4 | data × 2 | data × 1 | data × 7 |

Video Scaling Engine Accumulator

Accumulator 140 includes a product input 141, an accumulate input 142, a store input 143 and accumulator output 144. Accumulator 140 also includes adder 146, multiplexer 147 and memory element 145. The store input 143 is coupled to receive a store enable signal from the store enable input 103, and the accumulate input 142 is coupled to receive an accumulate enable signal from the accumulate input 104. Product input 141 is coupled to multiplier output 113 to receive the product of the input pixel and selected coefficient output by multiplier 110. Adder 146 receives the product from the product input 141 and a value output by multiplexer 147 as inputs, and outputs a sum thereof. The output of adder 146 is coupled to the input of memory unit 145 and, upon detecting a gating edge of a store enable signal at store input 143, the sum output by adder 146 is stored in memory unit 145. The output of memory unit 145 is asserted at the accumulator output 144 and is also routed back to an input of multiplexer 147.

Accumulate input 142 is coupled to multiplexer 147 so that when an accumulate enable signal is asserted at the accumulate input 142, multiplexer 147 passes the value output by memory unit 145 to adder 146. When the accumulate enable signal is deasserted at accumulate input 142, multiplexer 147 passes a zero value (designated "0x00" in FIG. 1) to an input of adder 146. It follows that if the accumulate enable signal is asserted at the time the store enable signal is detected, a sum of the product output by multiplier 110 and the existing contents of memory unit 145 will be stored in memory unit 145. If the accumulate enable signal is deasserted at the time the store enable signal is detected, the existing contents of memory unit 145 will be overwritten with the product output by multiplier 110. Thus, when asserted, the accumulate enable signal allows a sum of products sequentially output by multiplier 110 to be accumulated in memory unit 145. When deasserted, the accumulate enable signal allows the value stored in memory unit 145 to be reset to the product most recently output by multiplier 110.

Although adder 146 of accumulator 140 is shown as being distinct from adder 123 in multiplier 110, it will be appreciated that adder 146 and adder 123 could be combined to form a single adder element capable of adding the outputs of multiplier circuits 115,116 and 117 and the output of memory unit 145.

Video Scaling Engine Divider

Divider 170 includes a divider input 171, a divide circuit 173 and a divider output 172. Divider input 171 is coupled to the output 144 of Accumulator 140 and receives the data value output by memory unit 145. Divide circuit 173 is coupled to receive input from divider input 171 and, in one embodiment of the present invention, performs a divide by power of two operation by routing the Nth bit of the value received from the divider input 171 to the least significant (the "zeroth") bit of the divider output 172. Within circuit 173, the individual conductors used to conduct the output of accumulator 140 to divider 170 have been depicted. Conductors 174, 175, 176, and 177 conduct the 0th, 1st, 2nd and 3rd bits, respectively, of the output of accumulator 140 to the divider 170. By coupling the conductor 177, conducting the 3rd bit of the accumulator output 144, to the least significant bit of divider output 172, a divide by eight is achieved. It will be appreciated that other dividend values and other circuits for implementing a division operation may be used without departing from the spirit and scope of the present invention.

Overview of a Method for Scaling Video Data in a Video Camera

Figure 2:
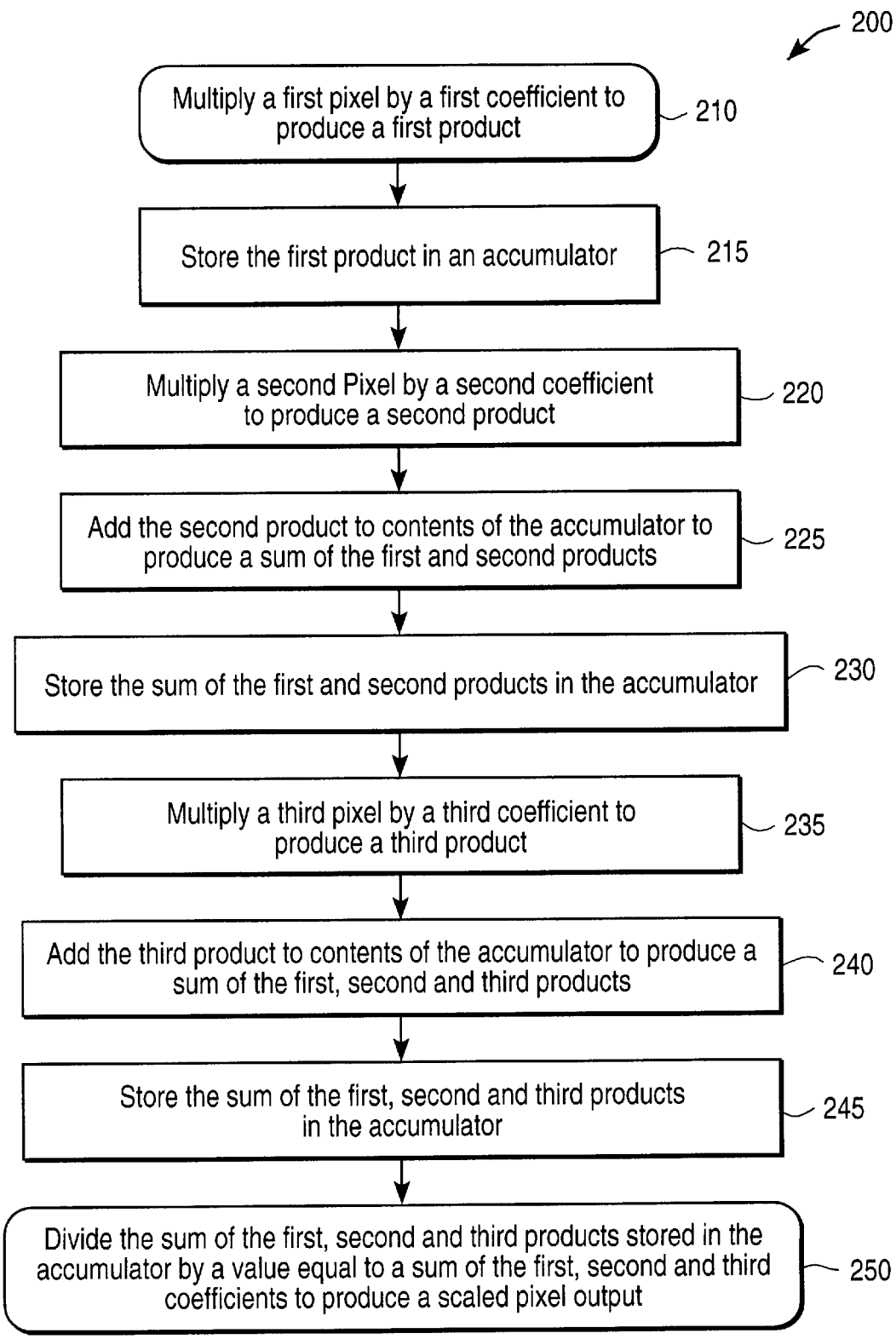
FIG. 2 illustrates a method for scaling digital video data using the video scaling engine of FIG. 1.

FIG. 2 illustrates a method 200 for scaling video data in a video camera utilizing the above-described video scaling engine 100. The method depicted takes place in three clock cycles, one for each tap of the three-tap FIR filter implemented in video scaling engine 100. The clock cycles correspond to cycles of the store enable signal described above and are described further in reference to FIG. 4 below. Each edge of the store enable signal that gates data into accumulator 140 of FIG. 1 marks the transition into a new clock cycle. Although a method for implementing a three-tap FIR filter is depicted in FIG. 2, it will be readily appreciated that a FIR filter having any number of taps may be realized by extending the number of clock cycles in which products are accumulated.

First Clock Cycle

At step 210 of method 200, during a first clock cycle, a first pixel is multiplied by a first coefficient to produce a first product. Referring to the scaling engine 100 of FIG. 1, this is accomplished by receiving the first pixel at the multiplier input 111 and also receiving a coefficient select signal at selector input 112 to select the first coefficient. The resulting product output at multipler output 113 corresponds to the first product of step 210 of method 200.

At step 215 of method 200, still during the first clock cycle, the first product is stored in an accumulator . Referring to FIG. 1, this is accomplished by deasserting the accumulate enable signal at accumulate input 142 of accumulator 140 and storing the product received at product input 141 at the next gating edge of the store enable signal detected at store input 143. Since the accumulate enable signal is deasserted when the store enable edge occurs, only the product output by multiplier 110 is stored in the memory unit 145. At the gating edge of the store enable signal, the first clock cycle is considered ended and a second dock cycle begun. Accordingly, in FIG. 2, method 200, the transition to a second clock cycle occurs upon completion of step 215.

Second Clock Cycle

At step 220 of method 200, during the second clock cycle, a second pixel is multiplied by a second coefficient to produce a second product. At step 225, the second product is added to contents stored in the accumulator (i.e., the first product) to produce a sum of first and second products. At step 230, the sum of the first and second products is stored in the accumulator. Referring to FIG. 1, storage of the sum of first and second products is accomplished by asserting the accumulate enable signal at accumulate input 142 of accumulator 140 so that the output of adder 146 is the sum of the second product from the multiplier 110 and the first product from memory unit 145. Upon detecting a gating edge of the store enable signal at store input 143, the sum of the first and second products is stored in memory unit 145. At the gating edge of the store enable signal, the second clock cycle is considered ended and a third clock cycle begun. Accordingly, in method 200 of FIG. 2, the transition to a third clock cycle occurs upon completion of step 230.

Third Clock Cycle

At step 235 of method 200, during the third clock cycle, a third pixel is multiplied by a third coefficient to produce a third product. At step 240, the third product is added to contents of the accumulator and stored in the accumulator to produce a sum of the first, second and third products. At step 245, the sum of the first, second and third products are stored in the accumulator. The operation of the scaling engine of FIG. 1 to accomplish steps 235, 240 and 245 of method 200 is as described in reference to steps 220, 225 and 230 above. At step 250, still in the third clock cycle, the sum of the first, second and third products stored in the accumulator are divided by a value equal to the first second and third coefficients to produce the scaled video output.

Referring to FIG. 1, the division operation of step 250 of method 200 is performed by divider 170. In one embodiment of the present invention, divider 170 divides the value received at the divider input 171 by a constant power of two and the first, second and third coefficients are chosen so that their sum equals or nearly equals the power of two dividend applied by the divider. This is discussed further in reference to FIG. 5 below.

It will be appreciated that while the division operation of step 250 of method 200 has been described as occurring during the third clock cycle, the divider 170 described in reference to FIG. 1 will continually output a value representing the contents of accumulator 140 divided by a chosen dividend. In one embodiment of the present invention, the sampling of the divider output 172 is synchronized with the three clock cycle generation of the output pixel.

Video Camera Block Diagram

Figure 3:
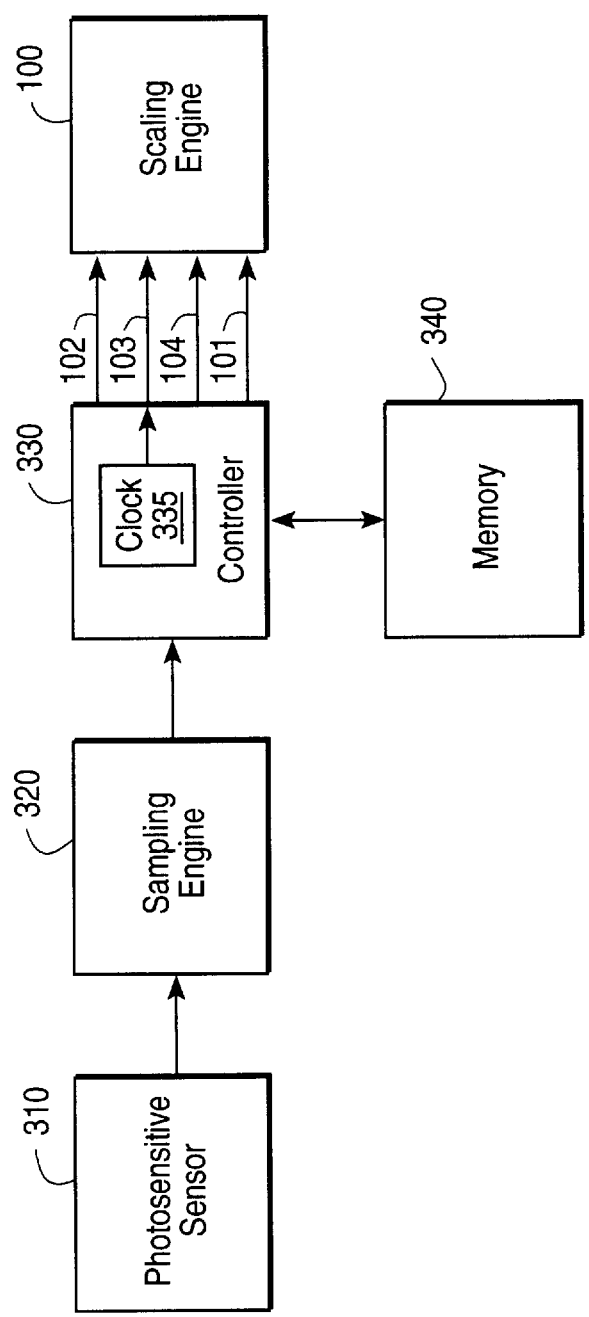
FIG. 3 illustrates a block diagram of a video camera incorporating the video scaling engine of the present invention.

FIG. 3 depicts a block diagram of a video camera incorporating the video scaling engine of the present invention. A photosensitive sensor 310, such as a charge-coupled device (CCD) array, is used to generate an electrical representation of an image. Sampling engine 320 samples the electrical representation of the image generated by sensor 310 at regular intervals to produce a digital video signal. Sampling engine 320 transfers the digital video signal, which includes a stream of pixels, to controller 330. Controller 330 then writes the individual pixels into a memory 340. Controller 330 is responsible for controlling the operation of video scaling engine 100 and, in one embodiment of the present invention, includes a clock circuit 335 for clocking the store enable input 103 of the video scaling engine 100. Controller 330 retrieves pixels previously stored in memory 340 and asserts the pixels, one after another, at the pixel input 101 of scaling engine 100. Controller 330 also asserts the output of clock 335 at the store enable input 103 of scaling engine 100, a coefficient select signal at coefficient select input 102 of scaling engine 100, and an accumulate enable signal at the accumulate enable input 104 of scaling engine 100.

Timing Diagram

Figure 4:
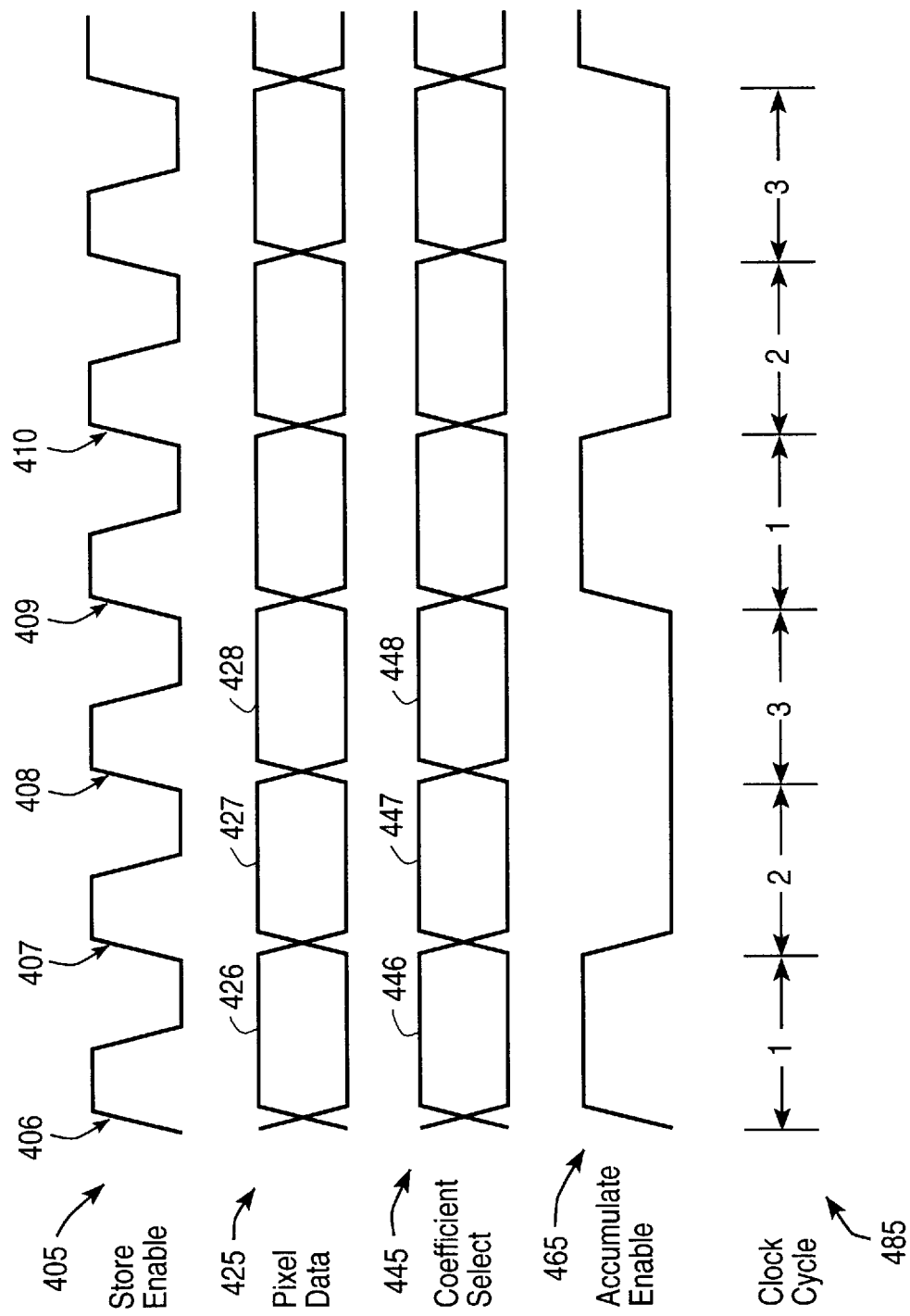
FIG. 4 illustrates a timing diagram of signals issued to the video scaling engine of the present invention.

FIG. 4 depicts a timing diagram 400 of signals output by controller 330 of FIG. 3 and received by video scaling engine 100 of FIG. 1. The timing diagram 400 is described below in reference to FIG. 1 and FIG. 4.

A rising edge of the store enable signal 405 marks the transition from one clock cycle to the next as shown by clock cycle label 485. Pixel signal 425 is presented to the pixel input 101 of the video scaling engine 100, with a new pixel being presented after every rising edge of the store enable signal 405. Likewise, coefficient select signal 445 is asserted at the coefficient select input 102 with a new coefficient selection presented after every rising edge of the store enable signal 405. Finally, accumulate enable signal 465 is asserted at the accumulate enable input 104 of scaling engine 100. Although accumulate enable signal is depicted as an active-low logic signal, an active-high logic signal could also be used.

A first clock cycle begins at the rising edge 406 of the store enable signal 405. During the first clock cycle, a first pixel 426 is presented to the pixel data input 101 of the video scaling engine 100 and a first coefficient selection 446 is presented to the coefficient select input 102 of the video scaling engine 100. The first pixel 426 is multiplied by the coefficient selected by a first coefficient selection 446 to output a first product to the accumulator 140. The accumulate enable signal 465 is maintained in an inactive state (held high) during the first clock cycle so that, at the next rising edge 407 of the store enable signal 405, the first product is gated into the accumulator 145 without addition of existing accumulator contents.

After rising edge 407, a second clock cycle is begun and the accumulate enable signal 465 is activated (driven low). A second pixel 427 is multiplied by the coefficient indicated by a second coefficient selection 447 to output a second product to the accumulator 140. Since the accumulate signal is active, at the next rising edge 408 of the store enable signal 405, the second product is added to the previously accumulated first product and the sum of the first and second products is stored in the accumulator 140.

After rising edge 408, a third clock cycle is begun and the accumulate enable signal 465 is maintained in an active state. A third pixel 428 is multiplied by the coefficient indicated by a second coefficient selection 448 to output a third product to the accumulator 140. Since the accumulate signal is active, at the next rising edge 409 of the store enable signal 405, the third product is added to the previously accumulated sum of the first and second products and the sum of the first, second and third products is stored in the accumulator 140.

After edge 409 of the store enable signal 405, the cycle described above is repeated, starting again with a first clock cycle. During the first clock cycle following store enable edge 409, the sum of the first second and third products in accumulator 140 is divided by divider 170 to output a scaled pixel output at scaling engine output 105.

It will be appreciated that while store enable signal 405 has been depicted as a periodic waveform and the rising edge of the store enable signal 405 has been used as the gating edge, store enable signal 405 need not be periodic to practice the present invention and the trailing edge of the store enable signal 405 could alternatively be used as the gating edge. Further, though the timing diagram for a three-tap FIR has been shown, an N-tap FIR can be achieved by maintaining accumulate enable signal 465 active for N−1 taps. Of course, if a normalized output is desired, the dividend applied by divider 170 of FIG. 1 may have to be changed.

Video Scaling

In one embodiment of the present invention, video scaling is performed separately in the horizontal (column) and vertical (row) dimensions of a video frame. For example, to scale a 352×288 pixel image to a 176×144 pixel image, the input image is scaled by a 2:1 ratio in the horizontal direction and then by a 2:1 ratio in the vertical direction.

Figure 5:
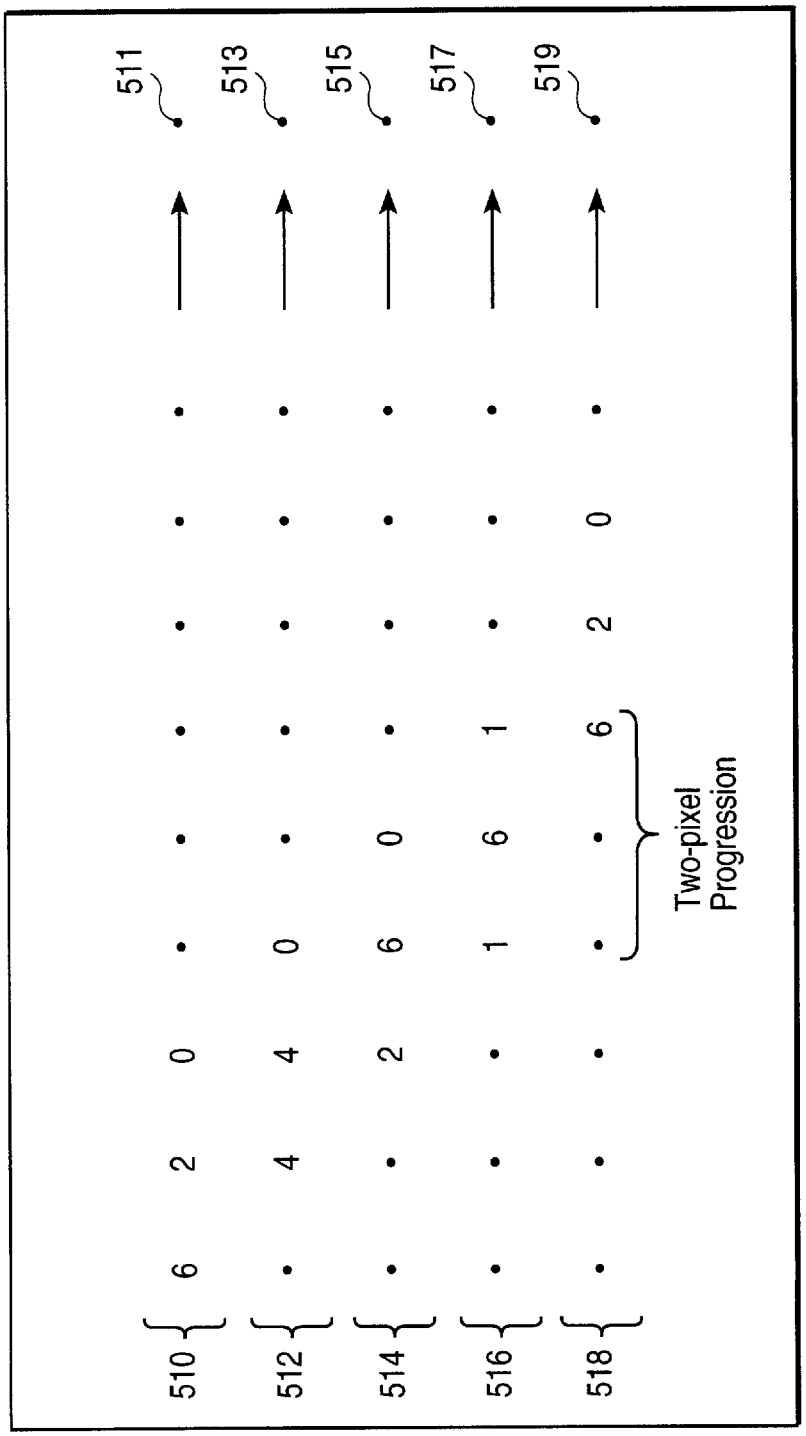
FIG. 5 illustrates the manner in which filter coefficients are applied to an input pixel stream to achieve a 5:4 scaling ratio.

FIG. 5 illustrates the manner in which FIR filter coefficients are applied to scale the input data by the ratio 5:4. Rows of dots (510, 512, 514, 516 and 518) are used to represent a stream of source pixels with each dot representing an individual pixel. The leftmost position of each row is first in time and each of the rows 510, 512, 514, 516 and 518 represent the same set of source pixels. In pixel row 510, the coefficients 6, 2, and 0 are used in place of dots to indicate that the first three pixels of the row are filtered by a three-tap FIR filter having tap coefficients 6, 2 and 0. The output pixel resulting from application of the FIR filter to the first three pixels in the row is indicated by dot 511. Likewise, dots 513, 515, 517 and 519 indicate the output pixels resulting from application of FIR filter coefficients to pixels in pixel rows 512, 514, 516 and 518, respectively.

Pixel row 512 represents the same set of pixels as the first row 510, but the three taps of the FIR have progressed to a different set of input pixels and the filter coefficients are changed. Ordinarily the three taps of the FIR will progress by one input pixel to the next set of three pixels in the input stream after generation of each output pixel. However, to reduce the number of output values relative to the number of input values by a scaling factor of M:N (M being the input pixel count), a two-pixel progression of the FIR filter occurs at least once every N pixel progressions. This is referred to as skipping a pixel. In the 5:4 scaling illustration of FIG. 5, a single pixel progression is shown after rows 510, 512, and 514, followed by a two-pixel progression after row 516. Thus, after every four output pixels, one input pixel is skipped by a two-pixel progression of the FIR filter. The result is a 5:4 scaling ratio. At row 518, the sequence of filter coefficients is repeated starting with the 6, 2, 0 coefficient set.

Pixel skipping is accomplished in the video camera of FIG. 3, for example, by controller 330 addressing pixels in memory 340 such that the address of the first pixel of each three-pixel set progresses by one pixel after each of N−1 pixels output by the scaling engine 100. Then after the Nth pixel is output, controller 330 causes the address of the first pixel input to the scaling engine to be progressed by two pixels. In this way an M:N scaling ratio can be achieved.

Normalizing Based on a Constant Coefficient Sum

Each of the sets of coefficients depicted in FIG. 5 sum to constant (i.e., 6+2+0=8, 4+4+0=8, etc.). This allows each output pixel to be normalized in one embodiment of a video scaling engine by dividing the accumulated sum of products by the same constant. In one embodiment of the present invention, for example, each of the sets of coefficients sum to eight and divider 170 of FIG. 1 performs a three-bit shift to divide the accumulated sum of products by eight. The result is a normalized output pixel. It will be appreciated that the value eight is merely a convenient power of two and that another value could also be used. For example, scaling engine 100 could include logic to compute a sum of the applied filter tap coefficients and provide the sum of coefficients to the divider 170 to be used as the normalizing dividend.

Based on the discussion of video data scaling engine 100 of FIGS. 1 and 3 above, it will be appreciated that the output pixels 511, 513, 515, and 517 each require three clock cycles to produce (i.e., three gating edges of the store enable signal). Since one pixel is input to the scaling engine 100 after every clock cycle, and one pixel is output every three clock cycles, it is evident that, with respect to scaling engine 100, the input pixel frequency is three times the output pixel frequency. Stated more generally, the input pixel rate is N times the output pixel rate, where N is the number of taps in the FIR filter applied by the scaling engine 100. Consequently, in any application where scaled video data is consumed at a slower rate than unscaled data can be delivered to the scaling engine 100, the present invention can be used to lower the transistor gate count in the final product providing the reduced power consumption, propagation delay and ASIC die size as discussed above.

The sequence FIR filter coefficients and pixel skip pattern is determined by a user-selected scaling ratio. In one embodiment of the present invention, respective sequences of filter coefficients corresponding to various scaling ratios are stored in a coefficient storage within controller 330 of FIG. 3. It will be appreciated that the sequences of filter coefficients may supplied from any source without departing from the scope of the present invention.

FIG. 6 is provided to illustrate the sequence of coefficients used to produce scaling ratios 3:2, 5:3, 2:1 and 12:11 in one embodiment of the present invention. Like the coefficients in FIG. 5, each of the coefficient sets applied to generate an given output pixel sums to a constant value.

A method and apparatus for scaling digital video data are thus described. While the present invention has been described in particular embodiments and through particular examples, the present invention should not be construed as limited by such embodiments and examples, but rather construed according to the following claims.

What is claimed is:

1. In a video camera, a method for scaling digital video data, said method comprising:

in a first time period, performing the steps of:
    multiplying a first pixel by a first coefficient to produce a first product; and
    storing the first product in an accumulator;

in a second time period, performing the steps of:
    multiplying a second pixel by a second coefficient to produce a second product;
    adding the second product to contents of the accumulator to produce a sum including the first and second products; and
    dividing the sum by a value based on at least one of the first and second coefficients to produce a scaled video data output value.

2. The method of claim 1 wherein said step of multiplying a first pixel by a first coefficient to produce a first product comprises the steps of:
    shifting the first pixel by a first number of bits to produce a first intermediate product;
    shifting the first pixel by a second number of bits to produce a second intermediate product; and
    adding the first intermediate product to the second intermediate product to produce the first product.

3. The method of claim 2 wherein said step of shifting the first pixel by a first number of bits to produce a first intermediate product comprises the step of receiving a coefficient selection signal, the coefficient selection signal indicating the first number of bits.

4. The method of claim 2 wherein said step of dividing the sum by a value based on at least one of the first and second coefficients comprises the step of dividing the sum by a value based on the first number of bits.

5. The method of claim 2 wherein said step of dividing the sum by a value based on at least one of the first and second coefficients comprises the step of shifting the sum by a third number of bits, the third number of bits being based on the first number of bits.

6. The method of claim 1 wherein said step of adding the second product to contents of the accumulator to produce a sum comprises the step of detecting an accumulate enable signal and adding the second product to contents of the accumulator in response thereto.

7. The method of claim 1 wherein said step of dividing the sum by a value based on at least one of the first and second coefficients comprises the step of dividing the sum by a value based on a sum of the first and second coefficients.

8. A video camera comprising:
    a clock circuit configured to generate a clock signal;
    a sensor configured to generate a plurality of pixels; and
    a video scaling engine coupled to said clock circuit and said sensor, said video scaling engine being configured to apply a multiple-tap finite impulse response filter (FIR) to the plurality of pixels over N cycles of the clock signal to generate a scaled output value, the number of taps of the multiple-tap FIR defining N.

9. The video camera of claim 8 wherein said video scaling engine includes:
    a multiplier configured to multiply each of the plurality of pixels by a respective tap coefficient and output the resulting product; and
    an accumulator coupled to said multiplier and configured to accumulate products output by said multiplier into a sum of products, said sum of products being accumulated over N cycles of the clock signal.

10. An apparatus for scaling digital video data, said apparatus comprising:
    a multiplier including a pixel input, a coefficient selection input and a multiplier output, said multiplier being configured to multiply a pixel received at the pixel input by a coefficient indicated by a coefficient selection signal received at the coefficient selection input and assert the resulting product at the multiplier output; and
    an accumulator having a product input coupled to receive a product from the multiplier output, an accumulate enable input for receiving an accumulate enable signal, a store enable input for receiving a store enable signal, a memory unit and an accumulator output, said accumulator being configured to store a value in the memory unit in response to detecting the store enable signal and to output the value stored in the memory unit at the accumulator output, the value stored in the memory unit being the product received at the product input if the accumulate enable signal is inactive when the store enable signal is detected, and the value stored being a sum of the product received at the product input and prior contents of the memory unit if the accumulate enable signal is active when the store enable signal is detected.

11. The apparatus of claim 10 further comprising a divider having a divider output and a divider input coupled to the accumulator output, said divider being configured to divide a value received at the divider input by a dividend and assert the resulting quotient at the divider output.

12. The apparatus of claim 11 wherein the divider comprises a circuit to route the Nth bit of the value received at the divider input to the least significant bit of the value asserted at the divider output.

13. The apparatus of claim 10 wherein said multiplier further includes a plurality of multiplying circuits each coupled to the pixel input and configured to output the pixel received thereon multiplied by a constant.

14. The apparatus of claim 13 wherein said multiplier further includes adder logic coupled to each of the plurality of multiplying circuits and to the multiplier output, the adder logic being configured to assert a sum of outputs from the plurality of multiplying circuits at the multiplier output.

15. The apparatus of claim 13 wherein one of the plurality of multiplying circuits is a shift circuit configured to multiply the pixel by the $N^{th}$ power of two by shifting the pixel N bits.

16. The apparatus of claim 15 further comprising a divider having a divider output and a divider input coupled to the accumulator output, said divider being configured to route the $M^{th}$ bit of the value received at the divider input to the least significant bit of the value asserted at the divider output, N being the maximum power of two by which any one of the plurality of multiplier circuits is configured to multiply the pixel and M being at least greater than N.

17. The apparatus of claim 13 wherein the multiplier includes logic to decode the coefficient selection input into a plurality of multiply enable signals, each one of the plurality of multiply enable signals being coupled to a respective one of the plurality of multiplying circuits, and wherein each one of the plurality of multiplying circuits is further configured to output the pixel multiplied by a constant only when the one of the plurality of multiply enable signals coupled thereto is active.

18. An apparatus for scaling video data, said apparatus comprising:

a memory;

a control unit coupled to said memory and including a clock output, an accumulate enable output, a coefficient select output and a video data output, said control unit being configured to retrieve first and second pixels from said memory, output the first pixel at the video data output during a first cycle of a clock signal asserted at the clock output, output a first coefficient select signal at the coefficient select output during the first clock cycle, output the second pixel at the video data output during a second cycle of the clock signal, output a second coefficient select signal at the coefficient select output during the second clock cycle, and assert an accumulate enable signal at the accumulate enable output during the second clock cycle and deassert the accumulate enable signal during the first cycle;

a multiplier having a pixel input coupled to the video data output, a select input coupled to the coefficient select output and a multiplier output, said multiplier being configured to multiply a pixel received at the pixel input by a coefficient indicated by a coefficient select signal received at the select input and assert the resulting product at the multiplier output; and an accumulator having a product input coupled to receive a product from the multiplier output, a clock input coupled to receive the clock signal from the clock output, an enable input coupled to receive the accumulate enable signal from the accumulate enable output, a memory unit and an accumulator output, said accumulator being configured store a value in the memory unit in response to detecting an edge of the clock signal and to output the value stored in the memory unit at the accumulator output, the value stored in the memory unit being the product received from the multiplier output if the accumulate enable signal is deasserted when the edge of the clock signal is detected, and the value stored in the memory unit being a sum of the product received from the multiplier output and prior contents of the accumulator if the accumulate enable signal is asserted when the edge of the clock signal is detected.

* * * * *

UNITED STATES PATENT AND TRADEMARK OFFICE
CERTIFICATE OF CORRECTION

PATENT NO.    : 5,838,387          Page 1 of 1
DATED         : November 17, 1998
INVENTOR(S)   : Allen et al.

It is certified that error appears in the above-identified patent and that said Letters Patent is hereby corrected as shown below:

Column 5,
Line 61, delete "dock" and insert -- clock --.

Signed and Sealed this

Tenth Day of June, 2003

JAMES E. ROGAN
*Director of the United States Patent and Trademark Office*